Figure 1:
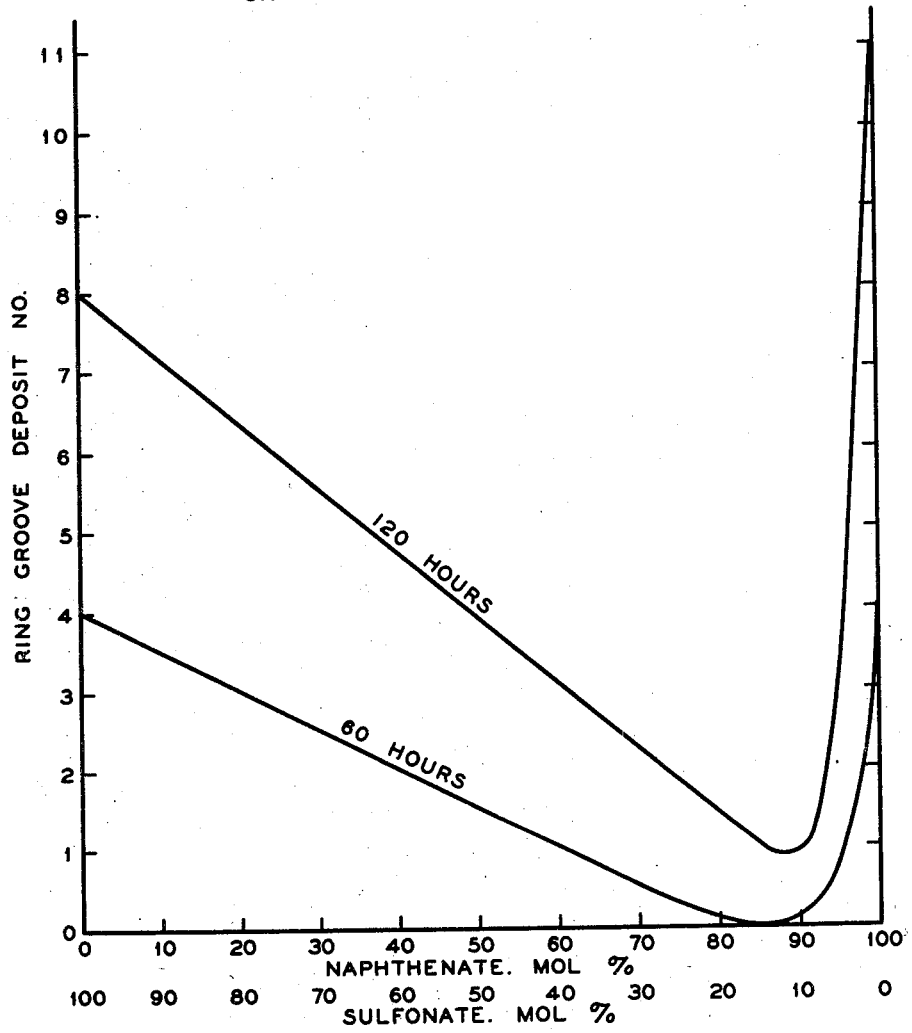

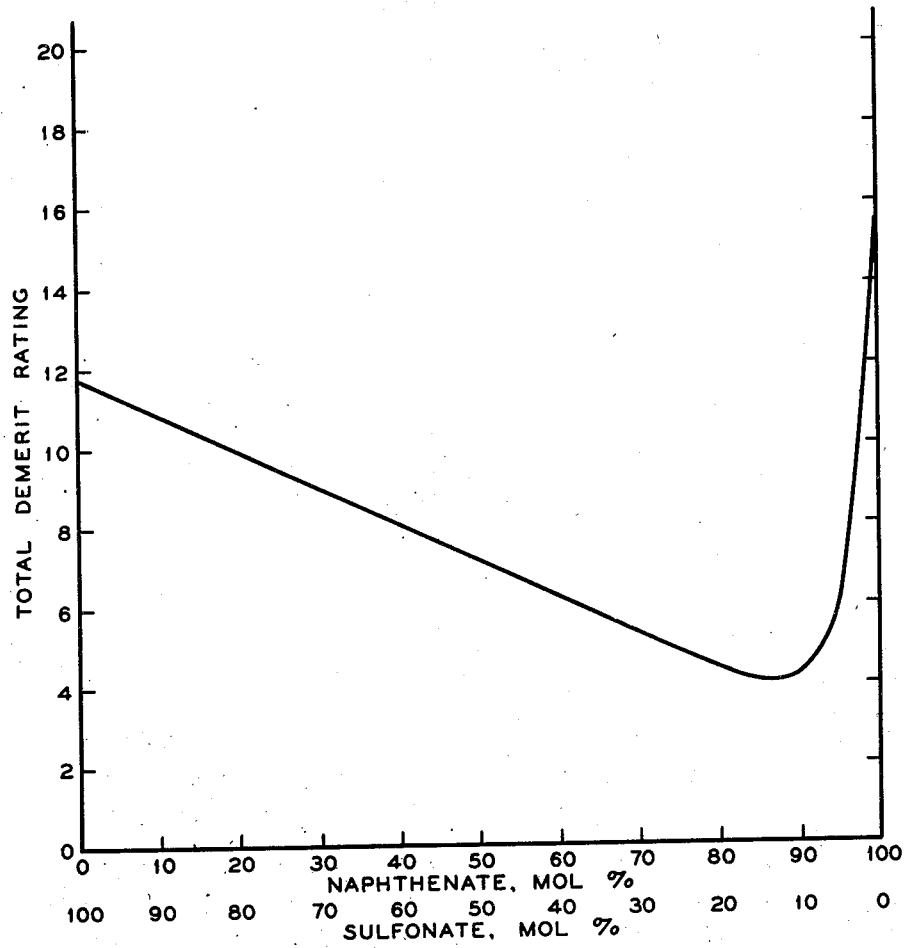

2,789,892
Patented Apr. 23, 1957

2,789,892
DIESEL FUEL COMPOSITION

Primo L. Pinotti, Larkspur, Calif., assignor to California Research Corporation, San Francisco, Calif., a corporation of Delaware Application October 22, 1952, Serial No. 316,281

5 Claims. (Cl. 44—69)

This invention relates to improved fuels for compression ignition engines, and more particularly to fuel for compression ignition engines containing additives which substantially reduce deposition and wear incident to the combustion of the fuel.

With the increased application of compression ignition engines such as diesel engines in the field of transportation and power production, greater emphasis has been placed upon improvements in the operating efficiencies of the engine as effected by the fuel component. It has been recognized that a number of undesirable features in diesel engine operation, such as increased fuel consumption, excessive exhaust smoking, and certain facets of engine overhauling due to wear may be in part attributed to the fuel oil, and is particularly a function of the deposit-forming characteristics of the fuel oil.

It has been determined that the presence of deposits on the fuel injector tips alters the normal fuel spray pattern and results in inefficient engine operation due to incomplete fuel combustion. Carbonaceous deposits on the exhaust valves prevent complete valve closure and permit escape of the fuel-air mixture before combustion occurs. The resulting incomplete combustion of the fuel occasioned by the presence of deposits in the fuel injection system and the combustion zone increases fuel consumption and promotes exhaust smoking, which is particularly objectionable in diesel trucking operations.

Additionally, deposition within the area of the combustion chamber aggravates engine wear and often necessitates replacement of the cylinder liners as well as the piston rings. An added impetus to the improvement of diesel fuel oils is the increased presence of sulfur in the diesel fuel. It has been recognized that the presence of sulfur contributes to the formation of corrosive combustion products which, in turn, promote engine wear.

In order to offset the corrosive action attributed to the presence of sulfur in diesel fuels, it has been previously proposed to incorporate an organic metal oxide compound in the high sulfur diesel fuel. However, such proposal, while of merit in reducing the corrosive effect of the sulfur in the fuel, imparts additional objectionable features and increases the deposit-forming characteristics of the fuel oil.

Contrasting the inadequacies of previous proposals for the improvements of diesel fuels, it has now been found possible to provide a fuel composition of greatly enhanced combustion efficiencies which allows prolonged engine operation with materially reduced deposit formation and a low wear rate. This improvement in fuel compositions is applicable to a low sulfur diesel fuel as well as a high sulfur diesel fuel.

It has been found that deposition and wear incident to the combustion of diesel fuel oil can be materially reduced by incorporating in the hydrocarbon fuel a particular combination of organic metal salts in a critical proportional ratio. The improved fuel composition of this invention is comprised of a hydrocarbon fuel suitable for use in compression ignition engines such as diesel engines, in which is incorporated a minor proportion of the combination of an oil-soluble organic lead sulfonate and an oil-soluble lead naphthenate in which the mole ratio of lead sulfonate to lead naphthenate is within the range of about 1:30 to about 1:1. This synergistic additive combination when present in the aforementioned critical proportionate range materially reduced the deposit-forming propensities of a diesel fuel while at the same time reducing wear associated with the presence of sulfur in the hydrocarbon fuel.

While the subject additive combination may be incorporated in any hydrocarbon fuel suitable for use in internal combustion engines, and particularly diesel engines, the improving effect of the additive is particularly found in those hydrocarbon fuels containing above about 0.5 weight percent of sulfur. Ordinarily the base fuels are a mixture of hydrocarbons boiling predominantly in the range of about 350 to about 850° F., which are derived from various petroleum crude oils. However, hydrocarbon fuels derived from other sources, such as shale oil or synthetic hydrocarbons obtained from the Fischer-Tropsch process, etc., may be improved by the subject invention. Specific examples of high sulfur base fuels are those derived from West Texas crudes, Santa Maria crudes, or the Arabian crudes, and involve either straight-run distillates or cracked distillates employed per se or as blends thereof.

As previously mentioned, the additive composition comprises a critical combination of an oil-soluble lead sulfonate and an oil-soluble lead naphthenate. The organic portion of the lead sulfonate may be derived from any oil-soluble high molecular weight organic sulfonic acid. Sulfonic acids having a molecular weight between about 200 to about 800 have been found suitable, although it is preferred to employ sulfonic acids having molecular weight above about 400. These sulfonic acids may be either aliphatic or aromatic sulfonic acids. The principal specification of the sulfonic acid is the presence of the sulfonate radical and an essentially hydrocarbon organic radical of sufficient molecular weight to impart oil-solubility to the compound. Illustrative of the specific sulfonic acids which may be employed are polypropene benzene sulfonic acids, petroleum mahogany sulfonic acids, dodecane sulfonic acids and synthetic alkyl aromatic sulfonic acids in which the alkyl radical contains about 14 to 20 carbon atoms.

The foregoing synthetic alkyl aromatic sulfonates have been found to be particularly suited for the additive composition of the invention. The lead salts of these sulfonic acids may be either neutral or basic lead salts provided the resulting compound is sufficiently oil-soluble to maintain a stable dispersion (either physical or molecular) in the hydrocarbon fuel when employed in the desired concentration.

The second component of the additive combination is an oil-soluble lead naphthenate or, in other words, a lead soap obtained from the alicyclic carboxylic acids derived from petroleum oils. These petroleum naphthenic acids are generally obtained as a mixture of alicyclic carboxylic acids whose average molecular weight will vary depending upon the crude source and the fraction of petroleum oil from which the acids are obtained. The acids generally contain a 5 carbon atom alicyclic ring which is substituted by alkyl radicals and the carboxyl group is usually on the beta carbon to the ring. Generally suitable for the purposes of the invention are those petroleum naphthenic acids having molecular weight above about 225. In lieu of these petroleum naphthenic acids, other oil-soluble fatty acids may be employed in the form of their oil-soluble lead salt. Again, the lead salts may be present as the neutral or basic salt, as well as mixtures thereof.

In order to obtain the improvements to a compression ignition engine fuel, the additive combination of lead sulfonate and lead naphthenate in its critical mole ratio should be present in the hydrocarbon fuel in a concentration based upon the lead content of the additive combination of at least 0.3 millimole of lead per kilogram of fuel. From this minimum concentration, the amount of additive incorporated in the fuel may be varied depending upon the type of base fuel and the degree of improvement required. The specific concentration will generally be within the range of 0.3 to 3.0 millimoles of lead per kilogram of fuel. For optimum effectiveness of the additive combination, it has been found preferable to incorporate the additive at a concentration between about 0.5 to 2.0 millimoles of lead per kilogram of fuel. As previously mentioned, the synergistic effect of the additive combination is obtained when the individual components are present in a mole ratio of lead sulfonate to lead naphthenate within the range of 1:30 to about 1:1. For optimum effectiveness this mole ratio range will preferably lie within the range of about 1:16 to about 1:4.

While all reference heretofore has been with respect to the direct incorporation of the additive combination in a hydrocarbon base fuel, it is to be understood that it is also contemplated that an additive concentrate may be prepared for incorporation into conventional diesel fuel in the field. Such additive concentrate will contain the combination of an oil-soluble lead sulfonate and an oil-soluble lead naphthenate in the unique molecular ratio range of about 1:30 to about 1:1 and is dissolved in hydrocarbon solvent carrier preferably to the extent of its solubility. The solvent carrier may contain hydrocarbons boiling in the diesel fuel boiling range, or mixtures thereof with lower boiling hydrocarbons which may be necessary to increase the solubility and maintain the high concentration of additive. Depending upon the particular type of hydrocarbon solvent employed as the carrier, a concentrate may be obtained which contains from 30 to 50 percent by weight of the subject additive combination. In application this concentrate is then incorporated in the base fuel to be improved in such proportions as to result in a final concentration of additive in the range of about 0.3 to 3.0 millimoles of lead per kilogram of fuel.

As an illustration of the effectiveness of the subject additive combination in the improvement of compression ignition engine fuels, the following examples are presented. In these examples the lead sulfonate is a neutral lead salt derived from a synthetic alkyl benzene sulfonic acid of an average molecular weight around 400. This acid is primarily a monoalkyl benzene sulfonic acid with approximately a $C_{17}$ carbon chain obtained by alkylation with a polypropene. The lead naphthenate is a conventional 60% basic lead salt of naphthenic acids derived from a Midway crude oil and having an average molecular weight of about 230. The range of molecular weight of the acids in the mixture of alicyclic carboxylic acids is from about 200 to about 260.

EXAMPLE 1

This example illustrates the amount of piston ring-groove deposition formed incident to combustion of a base fuel in comparison with the additive combination of the invention and its individual components. As is known, appreciable piston ring-groove deposition causes ring sticking, which latter in turn causes "blow-by" and cylinder galling.

The fuels were tested in Caterpillar diesel engines having 5¾ inch piston bore, 8-inch strokes, and 4-stroke cycles according to conventional procedure under the following operating conditions:

Test time _____ hours__ 60 and 120
Engine, R. P. M._____ 1000
Oil sump charge_____ qts__ 10
Water jacket temp_____ ° F__ 175
Oil to bearing temp_____ ° F__ 147
Engine brake mean effective pressure_____ p. s. i__ 75

The criterion of performance or "ring-groove deposit number" is determined by visual examination of the pistons in accordance with an accepted procedure for the determination of the volume of deposits in the ring groove. In this procedure arbitrary values are visually estimated in accordance with the following scale:

1. Thickness:
   Light brown to brown lacquer_____ 0.5
   Dark brown to heavy black lacquer_____ 1.0
   Groove completely filled to ring bottom_____ 10.0
2. Width:
   One-fourth of ring groove width_____ 0.25
   One-half of ring groove width_____ 0.50
   Three-quarters of ring groove width_____ 0.75
   Full ring groove width_____ 1.0
3. Circumference:
   36° (1/10 total circumference)_____ 1.0
   90° _____ 2.5
   180° _____ 5.0
   270° _____ 7.5
   360° (full circumference)_____ 10.0

The separate evaluations of thickness, width, and circumference are multiplied together to give the product which is designated as the "ring-groove deposit number."

The base fuel for these tests was a straight-run fraction of a California crude oil having an ASTM D–158 distillation between 370 and 681° F., a sulfur content of 1 weight percent sulfur, a cetane number of 45, and a gravity of 32.5° API. The additives were added to the base fuel in amounts of 1.3 mM. of lead per kilogram of fuel.

*Table I*

|  | Ring-groove deposit number |
|---|---|
| Base fuel, 60 hours | 6 |
| Base fuel plus 1.3 mM./kg. as lead of lead petroleum naphthenate: | |
|   60 hours | 4 |
|   120 hours | 11 |
| Base fuel plus 1.3 mM./kg. as lead synthetic alkyl aromatic sulfonate: | |
|   60 hours | 4 |
|   120 hours | 8 |
| Base fuel plus 1.14 mM./kg. of lead petroleum naphthenate and 0.16 m.M/kg. as lead of lead synthetic alkyl aromatic sulfonate: | |
|   60 hours | 0 |
|   120 hours | 0.9 |

EXAMPLE 2

This example is presented to illustrate the synergistic effect of the subject additive combination upon the reduction of engine wear. The fuels of this example were tested in a General Motor Series 71 engine according to Navy procedure simulating actual sea operating conditions for diesel powered generators, which conditions are designed to make the engines sensitive to the fuel characteristics.

The test conditions were:

| | |
|---|---|
| Time _____ hours__ | 300 |
| Engine, R. P. M. _____ | 1200 |
| Oil sump charge _____ gallons__ | 2 |
| Engine jacket temp _____ ° F__ | 175 |
| Oil sump temp _____ ° F__ | 227 |
| Horsepower per cylinder _____ | 15 |
| Brake mean effective pressure _____ p. s. i. g__ | 70 |

The base fuels for each of the tests was a straight run fraction of a California crude oil having ASTM D–158 distillation between 368 to 649° F., a sulfur content between 0.7 to 1.0 weight percent sulfur, a cetane number of about 46, and a gravity averaging 33° API. The piston rings of the Series 71 GM diesel engines were weighed before and after each test, and the difference or loss in weight, i. e., wear, was expressed as percent reduction in wear over the base fuel. The following table lists representative comparative data obtained by the above test procedure:

*Table II*

| | Percent reduction in wear |
|---|---|
| Base fuel plus 2.5 mM./kg. as lead of lead naphthenate | 27 |
| Base fuel plus 2.5 mM./kg. as lead of lead sulfonate | [1] 40 |
| Base fuel plus 0.63 mM./kg. as lead of lead naphthenate and 0.08 mM./kg. as lead of lead sulfonate | 56 |

[1] Test stopped at 214 hrs.

The directional effect of the foregoing test results have been observed on base fuels of varying sulfur content and in each instance the synergistic effect of the combination of lead sulfonate and lead naphthenate when employed within the mole ratio of 1:30 to 1:1 is readily apparent. The foregoing test data also illustrate the effectiveness of the subject additive combination even when employed in materially reduced total concentration as measured by the lead content.

EXAMPLE 3

This example is presented to show the effect of changing the sulfonate-naphthenate mole ratio on the top piston ring-groove deposition. The procedure used for obtaining the data on this example was the same as that described in Example 1. Likewise, the same base fuel and the same total amount of additive, i. e., 1.3 mM. of lead per kilogram of fuel, were employed as in Example 1.

Appended Figure 1 is a graphical presentation of the data obtained by the foregoing procedure. In this figure the percent ratio of lead sulfonate to lead naphthenate is plotted on the abscissa, and the ring-groove deposition number is plotted on the ordinate. From this figure, it is apparent that there is substantially less deposition when the mole ratio of sulfonate to naphthenate is between about 1:30 to about 1:1 than when the mole ratio is outside these limits. Further, it can be seen that when the mole ratio of naphthenate to sulfonate is between about 1:16 to about 1:4, even less deposition occurs.

EXAMPLE 4

This example is presented to show the effect of varying the mole ratio of lead sulfonate and lead naphthenate in the combination of lead sulfonate and lead naphthenate upon engine deposition. The fuels in this example were tested under the conditions described in Example 2. The deposition demerit rating was measured according to the procedure described below.

By this procedure, the deposition on the cylinder piston skirts is measured according to visual observation. By this means, the deposition or demerit value, as it is generally called, is rated from 0, wherein the skirt is clean, to 10, wherein the skirt is black, and numbers 1 to 9 assigned intermediate deposition values. The ring-groove deposition is determined as described in Example 1 and prorated so that a clean groove has a demerit rating of 0 and a groove completely filled to the back of the compression ring with deposit has a demerit rating of 10 and numbers 1 to 9 assigned to intermediate deposition values.

The amount of port clogging is determined. In this procedure a value of 0 is assigned when there is no clogging, and increases to the assignment of 10 when there is complete clogging, and numbers 1 to 9 assigned to intermediate degrees of clogging. These preceding values are then added to the amount of injector fouling, wherein no fouling is 0, and complete injector fouling is assigned a number 10, and the intermediate fouling is assigned a number from 1 to 9 to give the total demerit rating.

Figure 2:
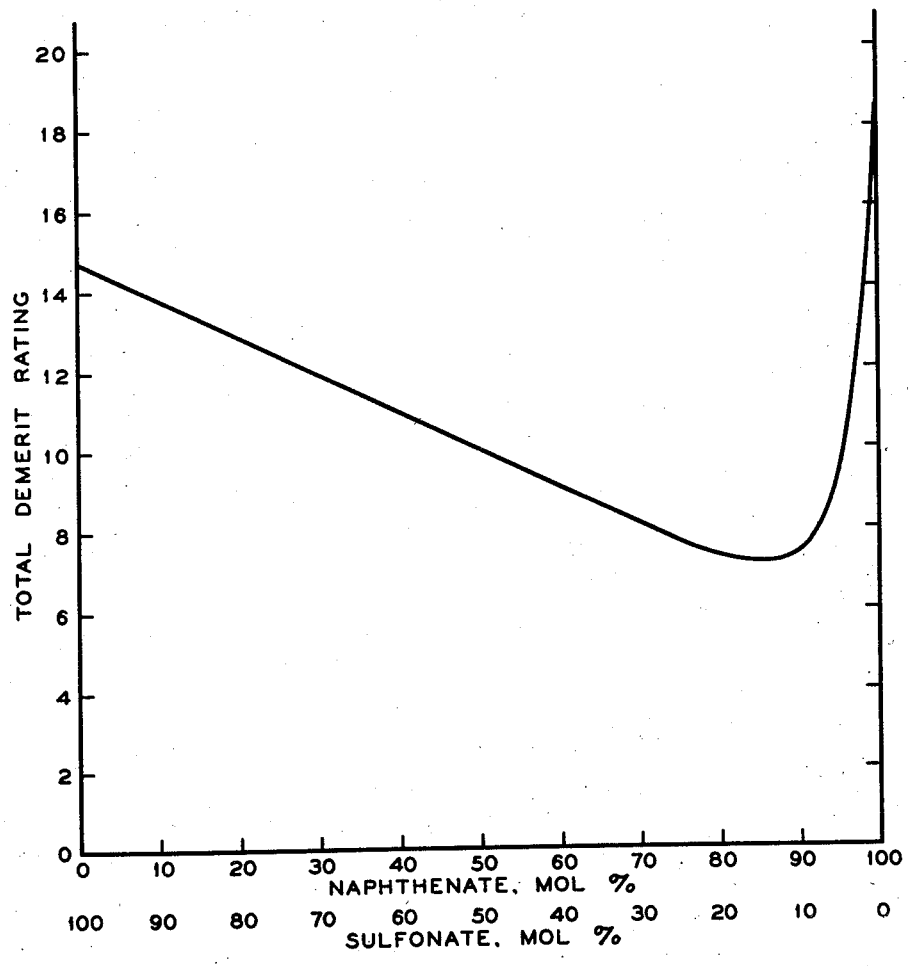

The appended Figure 2 illustrates data obtainable by the above procedure, wherein the percent ratio of naphthenate and sulfonate is plotted along the abscissa of the appended figure, and the total demerit rating, i. e., the sum of the piston deposition value, the groove deposit value, the port clogging, and the injector fouling, is plotted along the ordinate of the figure. From this figure, it is seen that the combination lead sulfonate-lead naphthenate gives a substantially lower total demerit rating than either the lead sulfonate or lead naphthenate. Further, it is seen that when the mole ratio of lead sulfonate to lead naphthenate is within about 1:30 to about 1:1, exceedingly little deposition occurs.

EXAMPLE 5

This example illustrates the effect of varying the mole ratio of the naphthenate and sulfonate in the combination lead sulfonate-lead naphthenate upon amount of combustion chamber deposition in another type of engine and higher additive concentration. The deposition was measured and obtained in the same manner described in the foregoing Example 4. The test conditions were the same as used in Example 4, but a different engine, a Caterpillar diesel engine, Series D–4400, having a piston bore of 4¼ inches, stroke of 5½ inches, and a 4-stroke cycle, was used in obtaining the data. In this example, the fuels had an additive content based upon lead of 2.5 mM. of lead per kilogram of fuel. The base fuel without additives gave a total demerit rating of 17.2.

Appended Figure 3 graphically illustrates the effect of changing the mole ratio of sulfonate to naphthenate upon total demerit rating, with representative data obtainable by the foregoing procedure. From this figure it is obvious the combination lead sulfonate-lead naphthenate gives substantially lower total demerit rating, i. e., less deposition, than either of the components lead sulfonate or lead naphthenate.

From the graphical presentation of data in Figures 1, 2, and 3, it is obvious that a critical mole ratio of lead naphthenate to lead sulfonate must be present in order to obtain minimum deposition. Further, these figures show that the critical mole ratio of lead sulfonate to lead naphthenate is between about 1:30 to about 1:1; and this ratio, in reference to Example 2, gives a substantial increase in wear reduction over either of the components of the combination.

It is understood that the specific examples and data herein given are set forth only by way of illustration, and that the invention is not liimted thereby or thereto, but is subject only to those limitations expressed in the following claims.

I claim:

1. An improved fuel comprising a major portion of hydrocarbons boiling within the range of about 350° F. to about 850° F. and from about 0.3 to about 3.0 mM./kg. of fuel of lead in the form of a combination of an oil-soluble lead salt of a monoalkyl benzene sulfonic acid having from 14 to 20 carbon atoms in the alkyl portion of said sulfonic acid salt and an oil-soluble lead salt of a petroleum naphthenic acid, wherein the mol ratio of the lead salt of the sulfonic acid to the lead salt of the naphthenic acid lies in the range of from about 1:16 to about 1:4.

2. The fuel of claim 1, wherein the mol ratio of the lead salt of the sulfonic acid to the lead salt of the naphthenic acid is about 1:8.

3. The fuel of claim 1, wherein the total lead content is between about 0.5 mM./kg. to about 2.0 mM./kg. of fuel.

4. The fuel of claim 1, wherein the hydrocarbon portion of the fuel is characterized by the presence of at least 0.5 weight percent of sulfur.

5. A concentrate adapted to be added to diesel fuel oil to reduce deposition and wear incident to the combustion of said fuel, comprising the combination of an oil-soluble lead salt of a monoalkyl benzene sulfonic acid having from 14 to 20 carbon atoms in the alkyl portion of said salt and an oil-soluble lead salt of a petroleum naphthenic acid, wherein the mol ratio of the lead salt of the sulfonic acid to the lead salt of the naphthenic acid lies in the range of from about 1:16 to about 1:4.

References Cited in the file of this patent

UNITED STATES PATENTS

| | | |
|---|---|---|
| 2,575,003 | Caron et al. | Nov. 13, 1951 |
| 2,691,572 | Pinotti et al. | Oct. 12, 1954 |

FOREIGN PATENTS

| | | |
|---|---|---|
| 658,418 | Great Britain | Oct. 10, 1951 |